United States Patent [19]

Nevard

[11] 4,238,216
[45] Dec. 9, 1980

[54] HEATING GLASS BATCH MATERIAL

[75] Inventor: Leslie A. Nevard, Liverpool, England

[73] Assignee: Pilkington Brothers Limited, St. Helens, England

[21] Appl. No.: 34,647

[22] Filed: Apr. 30, 1979

[30] Foreign Application Priority Data

May 9, 1978 [GB] United Kingdom ............... 18494/78

[51] Int. Cl.³ .............................................. C03B 3/00
[52] U.S. Cl. ......................................... 65/134; 65/27; 65/335; 55/99; 55/390; 106/52; 106/DIG. 8
[58] Field of Search ........... 264/117; 106/52, DIG. 8; 65/27, 134, 335; 55/99, 390

[56] References Cited

U.S. PATENT DOCUMENTS 3,953,190  4/1976  Lange .................................... 65/335

Primary Examiner—Arthur D. Kellogg
Attorney, Agent, or Firm—Burns, Doane, Swecker & Mathis

[57] ABSTRACT

A heating chamber for pellets of glass batch material has a pellet inlet in one wall of the chamber and a pellet outlet at a lower part of the chamber so that a bed of pellets is formed with an upper surface inclined at an angle of repose of the pellets. Hot gas is fed into the bed of pellets through a plurality of outlets arranged in a plane parallel to the surface of the bed so that gas emerging from all the outlets has a substantially constant path length to the surface of the bed.

14 Claims, 4 Drawing Figures

HEATING GLASS BATCH MATERIAL

BACKGROUND OF THE INVENTION

The invention relates to methods and apparatus of heating glass batch material and more particularly to preheating glass batch material in pellet form prior to feeding the pellets to a glass melting tank or furnace.

Raw materials used to form glass, known as glass batch material, are available in divided or powdered form and must be fed to a tank or furnace in which they are melted as a substantially homogeneous mixture so as to ensure that all the components can interact with one another to form homogeneous molten glass. In order to conserve energy and improve the rate at which the batch material is melted in the tank, the glass batch material can be formed into pellets prior to being fed to the tank or furnace and these pellets may be preheated, for example, using waste gases from the tank or furnace. In the operation of large melting tanks such as are used to feed molten glass to a flat glass forming line operating at loads in the region of 2000 to 5000 tons per week, there is a need to provide a continuous feed of preheated pellets. It is preferable to use a flow system with the pellets flowing in the opposite direction to the heating gases in order to handle the volume of pellets needed to maintain the desired feed of molten glass to the forming process. It is desirable to arrange for the heating gas to heat the pellets with an even distribution of heat transfer so that the pellets fed to the glass melting tank are at a substantially uniform temperature and thereby cause a consistent rate of melting within the tank and partially melted pellets are not carried down the melting tank.

It is an object of the present invention to provide improved apparatus and methods of preheating glass batch material in pellet form prior to feeding the pellets to a glass melting tank.

SUMMARY OF THE INVENTION

The invention provides a heating chamber for heating pellets of glass batch material before feeding to a glass melting tank, which chamber has a pellet inlet in the upper part of the chamber, a pellet supply system connected to said inlet, means limiting the upper extent of the inlet, so that when pellets are fed into the chamber a bed of pellets is formed with an upper surface lying in a plane passing through the upper edge of the inlet and inclined at the angle of repose of the pellets, an outlet spaced below said inlet in a lower part of the chamber through which outlet heated pellets may leave the heating chamber, and hot gas supply means for feeding a stream of hot gas to the interior of the chamber to heat the pellets, which hot gas supply means comprises an inlet passage, a plurality of gas outlet passages distributed within the chamber below the surface of the bed of pellets and arranged in a plane parallel to the surface of the bed of pellets so that gas emerging from all the gas outlet passages has a substantially constant path length from the outlet passages to the upper surface of the bed of pellets, and a gas outlet duct in an upper part of the chamber to exhaust the gas which passes upwardly from the surface of the bed of pellets.

By arranging to supply the pellets through an inlet in an upper part of the chamber and removing the pellets through an outlet in a lower part of the chamber, the pellets naturally form a bed having an inclined surface. The angle of inclination of the surface depends on the pellets themselves and the angle is known as the angle of repose. The position of the plane of the surface of the bed of pellets is determined by the position of the upper edge of the inlet to the chamber provided the pellets are fed in a way which keeps the inlet full at all times.

Preferably said heating chamber comprises a four sided chamber, the pellet inlet being provided in one side wall of the chamber and the pellet outlet being located adjacent an opposite side wall.

Preferably the pellet inlet comprises an elongated opening extending across substantially the entire width of the chamber. Preferably a feed hopper is connected to the chamber adjacent said opening so that the supply of pellets continuously fills said opening.

Preferably the outlet for removing pellets from the chamber is provided with a flow control device so that the flow of pellets through the bed in the chamber is controlled by the rate at which they are removed through the outlet.

In one convenient embodiment, the outlet for pellets is provided with a rotary valve device comprising a cylindrical housing opening into the chamber and a rotor located within the housing, said rotor having a plurality of radial blades providing pockets into which the pellets are fed as the rotor is rotated.

By arranging that the rotor blades engage the walls of the surrounding housing, the valve meters the flow of pellets from the heating chamber and also prevents admission of gases into the heating chamber through said outlet.

As an alternative flow control device, a reciprocating spade may be used.

The invention includes a heating chamber as aforesaid mounted adjacent a glass melting tank, the outlet of the heating chamber being located adjacent a filling end of the glass melting tank whereby pellets leaving the heating chamber may pass directly into the tank. In such an arrangement, the provision of a valve at the outlet of the heating chamber which prevents the entry of gas is particularly valuable as hot gases leaving a glass melting tank might otherwise be drawn directly into the base of the heating chamber. The temperature of such hot gases may be sufficient to sinter the pellets to one another thereby preventing a steady feed of pellets by causing blockages in the outlet or hindering a steady feed.

Preferably the hopper arranged to provide pellets to the inlet to the heating chamber is also provided with a valve device which permits passage of pellets to the heating chamber but controls the extent of air leakage into the heating chamber through said pellet inlet. Preferably a rotary valve is used having a rotary member with radial blades, rotatably mounted within a housing so that pockets are formed between adjacent blades, the pockets conveying pellets through the valve but substantially reducing air flow through said valve. As the inlet hopper is located in a region of relatively low temperature, the tips of the blades of the rotary member in the valve can be formed of a flexible material, such as synthetic rubber, so as to provide a good seal against the surrounding housing. Such tips will also reduce or prevent damage being done to the pellets as they are fed through the valve into the heating chamber.

Where a rotary valve is used to feed pellets to the heating chamber and a further rotary valve is used to control the flow of pellets through the outlet from the heating chamber, the lower valve controls the feed rate from the heating chamber and the feed of pellets through the upper valve is adjusted to keep a substantially uniform head of pellets adjacent the inlet to the heating chamber.

Preferably the plurality of gas outlet passages within the bed of pellets are provided in rows extending across the heating chamber transverse to the direction of movement from the inlet to the outlet.

Preferably the rows of outlets each extend horizontally with successive rows being arranged progressively lower in the heating chamber on moving away from the inlet to the heating chamber.

In a preferred arrangement, the chamber is provided with four side walls perpendicular to each other, with the pellet inlet located in the upper part of one wall and the pellet outlet located adjacent the bottom of an opposite wall, and said rows of hot gas outlets extend across the full width of the chamber between the remaining two side walls. Preferably said hot gas inlet passage is connected to two manifolds extending along opposite sides of the chamber adjacent said two remaining walls and the manifolds are connected to ducts extending horizontally across the chamber within the bed of pellets.

Preferably said ducts are each arranged to provide gas outlet passages substantially uniformly along their length. Preferably shield means is provided for each of said ducts to prevent blockage of said gas outlet passages by the pellets.

In order to draw the heating gases through the bed of pellets, the said gas outlet duct in the upper part of the chamber is preferably provided with extractor means to draw gas from the chamber. Said extractor means may comprise a fan.

Preferably the outlet for pellets from the heating chamber extends horizontally across the full width of the chamber. In some cases the outlet from the heating chamber may be arranged to feed pellets to a glass melting tank across substantially the full width of a filling pocket at the inlet end of the melting tank. In other cases it may be preferable to arrange a plurality of heating chambers as aforesaid side by side so that pellets may be fed to a glass melting tank simultaneously through said plurality of heating chambers. In such an arrangement where a plurality of heating chambers as aforesaid are arranged side by side, the supply of heating gas for the pellets may be fed through a duct common to all the heating chambers. The gas outlet duct may also include a duct common to all the heating chambers.

In some cases it may be desirable to pre-heat the pellets in two successive operations in which case two heating chambers as aforesaid may be used in sequence. Such arrangement may be particularly applicable where one operation is carried out to dry or partially pre-heat the pellets prior to being preheated to a required temperature in a second heating chamber.

The invention also includes a method of preheating pellets of glass batch material before feeding to a glass melting tank, which method comprises feeding a succession of pellets into a heating chamber and forming a bed of pellets within the chamber, the bed having an inclined upper surface at the angle of repose of the pellets, introducing hot gas into the bed of pellets at a plurality of positions distributed below the surface of the bed in a plane parallel to the surface of the bed so that the gases passing through the bed of pellets has a substantially constant path length over the full area of the bed, and removing the heated pellets from the heating chamber and feeding them to a glass melting tank.

The pellets may be preheated by use of gas heated specially for that purpose. Alternatively the pellets can be preheated using waste gases from the glass melting tank. Such a system using waste gases can contribute to the removal of pollutants from the waste gas. Such a removal can cause problems where the glass melting tank is heated by a fuel containing sulphur. Any sulphur in the waste gases can result in sulphur accumulating in the batch pellets at levels which are above those acceptable in the glass batch material. Care is therefore needed to avoid this situation by using waste gases only when the sulphur is below a satisfactory level i.e. by using a sulphur free fuel to heat the glass melting tank or if this is not available, by preheating the pellets with heating gases produced for that purpose without involving any direct contact with the waste gases from the glass melting tank.

The pellets used should be substantially uniform in size so as to enable relatively steady heat transfer conditions to be maintained in the heating chamber. It is important that they should not be small, or easily broken to form fines or powder like material, as this can result in a high pressure drop through the bed in the heating chamber. If the pellets are large this will mean that it will become more difficult to heat them uniformly on their passage through the heating chamber unless the residence time of the pellets in the chamber is increased and this causes an increase in the size of heating chamber required. It has been found that with pellets smaller than ¼ inch diameter, problems are encountered in passing the heating gas through the bed because of the pressure drop. If the pellets have a diameter above 1 inch problems can be encountered in achieving a satisfactory throughput of uniformly heated pellets without a major increase in the residence time of the pellets in the chamber. It is therefore preferred to use pellets having a mean diameter of ½ an inch, i.e. in the range ⅜ of an inch to ⅝ of an inch. In this specification, the term "pellet" includes not only agglomerates made e.g. in a pan pelletiser but also any compressed form or agglomerated form of glass batch which can remain in a coherent mass when handled in the equipment used.

DESCRIPTION OF THE PREFERRED EMBODIMENT

Figure 1:
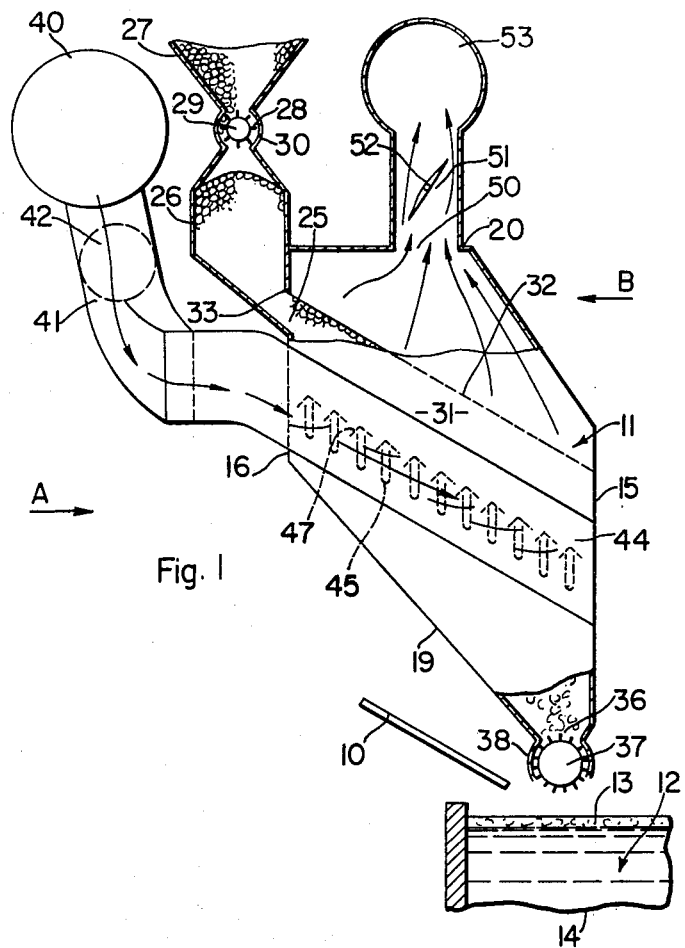
FIG. 1 is a sectioned side view of a heating chamber in accordance with the present invention.
Figure 4:
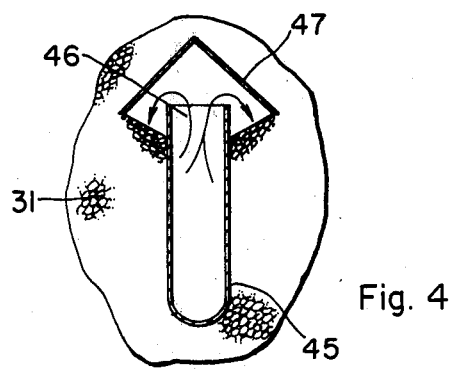
FIG. 4 is a scrap section showing a heating duct passing through a bed of pellets in the heating chamber, the view being seen in the same direction as FIG. 1.

The arrangement shown in FIG. 1 comprises a heating chamber 11 for preheating pellets of glass batch material for feeding into a glass melting tank 12. The heating chamber 11 is mounted above a filling pocket at one end of the glass melting tank so that preheated batch pellets may fall into the filling pocket of the glass melting tank and thereby form a blanket 13 of batch material on top of the molten glass 14. Cullet may also be added via a chute 10.

The heating chamber 11 has a front wall 15, a back wall 16, side walls 17 and 18, an inclined base 19 and a roof 20. The front back and side walls are arranged perpendicular to each other so that the interior of the chamber is generally rectangular. All the walls are surrounded by external heat insulation material which is not shown in the drawings.

The upper part of the rear wall 16 is provided with an inlet 25 in the form of an elongated rectangular slot extending horizontally across the full width of the rear wall 16. The inlet 25 communicates with a feed hopper 26 which is secured to the rear wall of the heating chamber. The hopper is fed by two inlet funnels 27 arranged side by side each being provided with a rotary flow control valve 28. Each flow control valve 28 comprises a rotary core 29 having a plurality of radial blades fitting closely against a cylindrical housing 30. The tips of the blades are made of flexible material such as synthetic rubber so as to provide a good seal against the cylindrical housing 30. As the rotary member 29 is rotated, the spaces between adjacent blades provide pockets which may be filled with pellets from the cones 27 and conveyed through the valve to a position where the pellets fall from each pocket in turn into the lower part of the hopper 26. This prevents excessive air from the atmosphere passing through the valve 28 and into the heating chamber 11. The supply of pellets is controlled so that the interior of the heating chamber 11 fills with pellets to form a bed marked 31 having an inclined upper surface 32. The surface 32 is inclined at the angle of repose of the pellets. The hopper 26 is arranged to provide a flooded hopper feed into the heating chamber so that the level of pellets in the hopper 26 is always above the upper edge of the inlet 25. In this way, the upper edge 33 of the inlet limits the upper extent of the inlet and determines the height of the free surface of the bed of pellets. The surface 32 is generally planar and passes through the upper edge 33 of the inlet 25.

The heating chamber 11 is provided with an outlet 36 at its lowermost point adjacent the junction of the front wall 15 and the inclined base 19. The outlet 36 is provided with a rotary valve. The rotary valve is generally similar to valve 28 already described in that it comprises a rotary member 37 carrying a plurality of radial blades rotatable within a cylindrical housing 38. In this case, the valve is formed of material resistant to high temperature due to the location of the outlet close to the glass melting tank 12. The rotary member of the valve 37 is driven by an adjustable drive means so that its speed of rotation is carefully controlled. In this way, the valve meters the rate of flow of pellets from the heating chamber 12 and it also prevents hot gases from the glass melting tank being drawn directly into the base of the heating chamber 11.

It will be appreciated that the plane inclined surface 32 of the bed of pellets results from the arrangement of feeding pellets in through an inlet in an upper part of the chamber and withdrawing the pellets from a lower part of the chamber at a position spaced across the chamber from the inlet.

In order to introduce heating gases to preheat the pellets, a hot gas supply system is provided. This comprises a horizontal hot gas inlet duct 40 extending along the rear of the heating chamber 11. The duct 40 has a downpipe 41 incorporating a butterfly valve 42 for isolating the heating chamber. The downpipe 42 is connected to two laterally extending passages 43 connected to manifolds 44 at opposite sides of the chamber. The manifolds extend along the sides of the chamber from the rear wall 16 to the front wall 15 with a downward inclination so that the manifolds are parallel to the surface 32 of the bed of pellets. The manifolds on opposite sides of each chamber are interconnected by a plurality of U-shaped ducts 45 which extend horizontally in rows across the full width of the chamber. Opposite ends of each duct 45 are in communication with the manifolds 44 so that hot gases flowing into the manifolds pass along the ducts 45. The ducts 45 are arranged in parallel horizontal rows, the rows becoming successively lower in the chamber on moving towards the front wall 15. In this way, the ducts 45 provide a plurality of gas outlets 46 at their upper edges, the outlets 46 being distributed in a plane parallel to the surface 32 of the bed of pellets. In order to prevent the ducts 45 becoming blocked with pellets, an inverted V shaped baffle 47 is mounted in a space position above the outlet 46 of each duct 45 so as to prevent pellets passing into the ducts 45. The baffles 47 extend across the full width of the chamber immediately above each duct 45.

It will be appreciated that gas emerging through the outlets 46 of each duct pass upwardly through the bed of pellets 31 above the ducts 45 and the hot gases thereby have a constant path-length through the pellets over the entire area of the bed of pellets. Gases which emerge through the surface 32 of the bed of pellets pass upwardly to an outlet 50 in the roof 20 of the heating chamber. The flow of gases is assisted by a fan (not shown) which is arranged to reduce the pressure in the upper part of the heating chamber. The exhaust gases pass from the outlet 50 through a vertical passage 51 containing a flow control butterfly valve 52 to an outlet duct 53.

Figure 2:
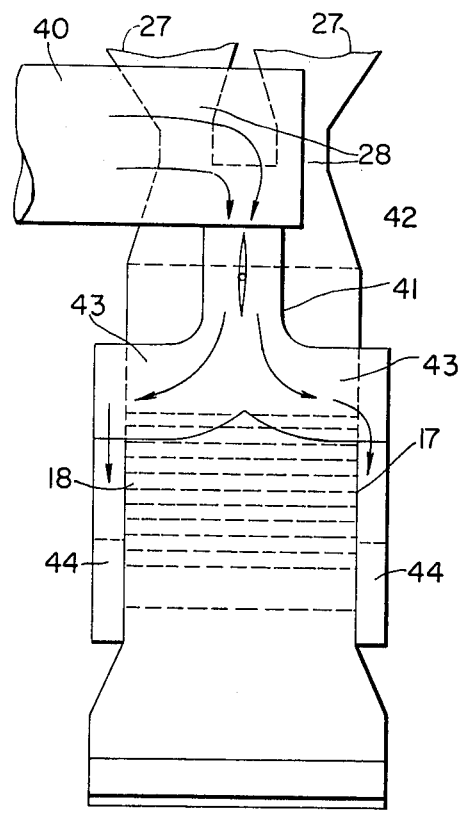
FIG. 2 is a view in the direction of the arrow A shown in FIG. 1.
Figure 3:
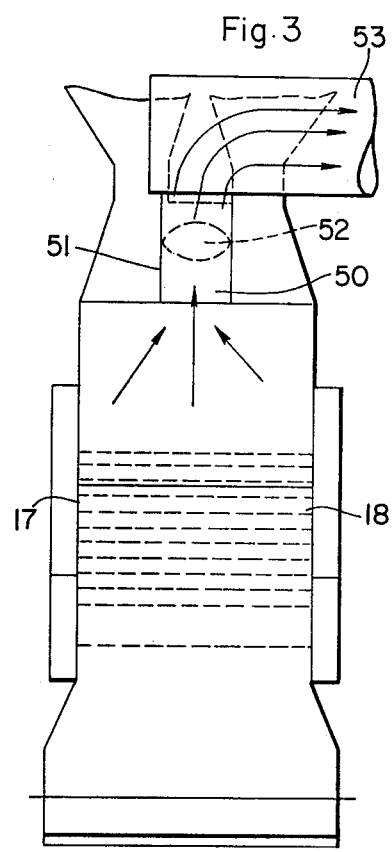
FIG. 3 is a view in the direction of the arrow B shown in FIG. 1.

For the sake of clarity, the gas outlet duct 53 has been omitted from FIG. 2 and the gas inlet duct 40 has been omitted from FIG. 3.

It will be appreciated that in operation, pellets are continuously removed through the outlet 36 at the bottom of the heating chamber 11 and pellets are continuously fed in through the inlet 25 so that the pellets forming the bed 31 move on a continuous path through the heating chamber.

If a single heating chamber 11 is provided for a glass melting tank 12, it is preferable for the outlet 36 to extend horizontally across substantially the full width of the filling pocket. It may however be preferable to provide a plurality of heating chambers side by side in order to feed preheated pellets to the whole width of a filling pocket of a large glass melting tank which may operate for example at a load of 2,000 to 5,000 tons a week. In such an arrangement three separate heating chambers 11 each as described above, may be arranged side by side so that their outlets 36 extend side by side in a line across the glass melting tank. In such an arrangement, the heating gas for each heating chamber 11 may be supplied from a common duct 40 which is then provided with a respective downpipe 41 for each of the heating chambers. Similarly the exhaust gases passing upwardly through the pipe 51 may pass to a common gas outlet duct 53 for each of the heating chambers.

In operation, the pellets may be preheated to a temperature of about 550° C. and the temperature of the heating gas passing through the duct 40 may be of the order of 600° C.

I claim:

1. A heating chamber for heating pellets of glass batch material before feeding to a glass melting tank, which chamber has a pellet inlet in the upper part of the chamber, a pellet supply system connected to said inlet, means limiting the upper extent of the inlet so that when pellets are fed into the chamber a bed of pellets is formed with an upper surface lying in a plane passing through the upper edge of the inlet and inclined at the angle of repose of the pellets, an outlet spaced below said inlet in a lower part of the chamber through which outlet heated pellets may leave the heating chamber, and hot gas supply means for feeding a stream of hot gas to the interior of the chamber to heat the pellets, which hot gas supply means comprises an inlet passage, a plurality of gas outlet passages distributed within the chamber below the surface of the bed of pellets and arranged in a plane parallel to the surface of the bed of pellets so that gas emerging from all the gas outlet passages has a substantially constant path length from the outlet passages to the upper surface of the bed of pellets, and a gas outlet duct in an upper part of the chamber to exhaust the gas which passes upwardly from the surface of the bed of pellets, said outlet duct defining an outlet opening disposed above said plane passing through the upper edge of the inlet and inclined at the angle of repose of the pellets.

2. A heating chamber according to claim 1 in which the pellet inlet comprises an elongated opening extending across substantially the entire width of the chamber and the pellet supply system is connected to the chamber adjacent said opening so that the supply of pellets continuously fills said opening.

3. A heating chamber according to claim 1 which comprises a four sided chamber, the pellet inlet being provided in one side wall of the chamber and the pellet outlet being located adjacent an opposite side wall.

4. A heating chamber according to claim 3 in which the plurality of gas outlet passages within the bed of pellets are provided in rows extending across the heating chamber transverse to the direction of pellet movement from the inlet to the outlet.

5. A heating chamber according to claim 4 in which the rows of outlets each extend horizontally with successive rows being arranged progressively lower in the heating chamber on moving away from the inlet to the heating chamber.

6. A heating chamber according to claim 5 in which the chamber is provided with four side walls perpendicular to each other, with the pellet inlet located in the upper part of one wall and the pellet outlet located adjacent the bottom of an opposite wall, and said rows of hot gas outlets extend across the full width of the chamber between the remaining two side walls.

7. A heating chamber according to claim 1 in which the outlet for removing pellets from the chamber is provided with a flow control device so that the flow of pellets through the bed in the chamber is controlled by the rate at which they are removed through the outlet.

8. A heating chamber according to claim 7 in which the flow control device at the outlet is arranged to prevent entry of gas into the chamber.

9. A heating chamber according to claim 1 in which the pellet supply system is provided with a valve device which permits passage of pellets to the heating chamber but controls the extent of air leakage into the heating chamber through said pellet inlet.

10. A heating chamber according to claim 6 in which the hot gas supply means is connected to two manifolds extending along opposite sides of the chamber adjacent said two remaining walls and the manifolds are connected to ducts extending horizontally across the chamber within the bed of pellets.

11. A heating chamber according to claim 10 in which shield means is provided for each of said ducts to prevent blockage of said gas outlet passages by the pellets.

12. A heating chamber according to claim 1 in which the outlet for pellets from the heating chamber extends horizontally across the full width of the chamber.

13. A heating chamber according to claim 1 mounted adjacent a glass melting tank, the outlet of the heating chamber being located adjacent a filling end of the glass melting tank whereby pellets leaving the heating chamber may pass directly into the tank.

14. A method of preheating pellets of glass batch material before feeding to a glass melting tank, which method comprises feeding a succession of pellets into a heating chamber and forming a bed of pellets within the chamber, the bed having an inclined upper surface at the angle of repose of the pellets, introducing hot gas into the bed of pellets at a plurality of positions distributed below the surface of the bed in a plane parallel to the surface of the bed so that the gases passing through the bed of pellets has a substantially constant path length over the full area of the bed, exhausting the gases from a space which is disposed above the bed and which communicates with the bed along the entire surface thereof, and removing the heated pellets from the heating chamber and feeding them to a glass melting tank.

* * * * *